United States Patent
Wilhide et al.

(10) Patent No.: US 10,211,632 B2
(45) Date of Patent: Feb. 19, 2019

(54) HYBRID ENERGY STORAGE MODULE ARRANGEMENTS

(71) Applicant: Hamilton Sundstrand Corporation, Charlotte, NC (US)

(72) Inventors: Matthew L. Wilhide, Cherry Valley, IL (US); Christopher J. Courtney, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 108 days.

(21) Appl. No.: 15/230,181

(22) Filed: Aug. 5, 2016

(65) Prior Publication Data
US 2018/0041028 A1 Feb. 8, 2018

(51) Int. Cl.
*H02J 1/00* (2006.01)
*H02M 3/04* (2006.01)

(52) U.S. Cl.
CPC ............ *H02J 1/00* (2013.01); *H02M 3/04* (2013.01)

(58) Field of Classification Search
CPC .................... H02J 1/00; H02M 3/04
USPC ............................................ 307/52
See application file for complete search history.

(56) References Cited

U.S. PATENT DOCUMENTS

| | | | |
|---|---|---|---|
| 7,786,620 B2 | 8/2010 | Vuk et al. | |
| 8,058,749 B2 | 11/2011 | Radun | |
| 8,789,791 B2 | 7/2014 | Matasso et al. | |
| 9,013,066 B2 | 4/2015 | Kojori et al. | |
| 9,197,088 B2 | 11/2015 | Vieillard et al. | |
| 2009/0309416 A1* | 12/2009 | Bose | B60K 6/32 307/9.1 |
| 2014/0084817 A1 | 3/2014 | Bhavaraju et al. | |
| 2016/0083106 A1 | 3/2016 | Lebrun et al. | |

* cited by examiner

*Primary Examiner* — Hal Kaplan
(74) *Attorney, Agent, or Firm* — Locke Lord LLP; Scott D. Wofsy; Alicia J. Carroll

(57) ABSTRACT

A hybrid energy storage module includes a bus lead and two or more high-power modules connectable to the bus lead. A controller is operably connected to a first of the high-power modules and a second of the high-power module. The controller has a pulse mode, where the first high-power module is connected to the bus lead. The controller also has an extended mode, where both the first high-power module and the second high-power module are connected to the bus lead.

18 Claims, 4 Drawing Sheets

HYBRID ENERGY STORAGE MODULE ARRANGEMENTS

BACKGROUND OF THE INVENTION

1. Field of the Invention

The present disclosure relates electrical power systems, and more particularly to energy storage module arrangements for electrical power systems.

2. Description of Related Art

Vehicles such as aircraft commonly include electrical systems with on-board generator that converts rotational movement within the engines to electrical power. The generated electrical power is used to power on-board electrical components such as flight controls, sensors, or other on-board electrical devices. During standard operation such electrical systems typically accommodate a baseline electrical load, which normally requires a baseline level of electrical power from the on-board generator. When additional electrical power is required, such as for engine starting or environmental control, additional electrical power can be required from the power system, causing a temporary spike in electrical load.

To compensate for the temporary load spikes, generators with output ratings at least as high as the highest anticipated load spike are typically employed. This ensures that adequate power can be provided to the power system at all times, including during load spikes. In a typical power generation systems, the physical size of the generator is commensurate with the power rating of the generator, and load the generator size may be governed by the expected load spikes rather than the baseline power requirement of the electrical system.

Such conventional methods and systems have generally been considered satisfactory for their intended purpose. However, there is still a need in the art for improved electrical power systems. The present disclosure provides a solution for this need.

SUMMARY OF THE INVENTION

A hybrid energy storage module (ESM) includes a bus lead, two or more high-power modules connectable to the bus lead, and a controller operably connected to the two or more high-power modules. The controller arranged to select a pulse mode, wherein the controller connects the first high-power module to the bus lead, and an extended mode wherein the controller connects the first high-power module and the second high-power module to the bus lead to supplement power applied to a power bus according to electrical load on the power bus.

In certain embodiments, an electromagnetic interference (EMI) filter can be connected in series with the bus lead. The first high-power module can include a non-battery power source. The first high-power module can include an ultracapacitor. The first high-power module can include a high-power DC/DC power converter. The second high-power module can include a high-power battery source. The second high-power module can include a high-power DC/DC power converter.

In accordance with certain embodiments, the hybrid ESM can include a low-power module connectable the bus lead. The controller can be operably connected to the low-power module. The low-power module can include a low-power battery source. The low-power module can include a low-power DC/DC power converter. The extended mode of the controller can be a high-power extended mode, and the controller can have a low-power extended mode where the low-power module is connected to the bus lead.

It is also contemplated that, in accordance with certain embodiments, the hybrid ESM module can include an input lead connected to the controller for providing an input to the controller indicative of electrical load on a power bus of an aircraft power distribution system. The bus lead can be connected to a power bus of an aircraft power distribution system. A generator can be connected to the power bus. One or more loads can be connected to the power bus including a base load, a high-energy pulse load, and a high-energy extended load connected to the power bus. One or more of the electrical loads, individually or in combination, can exceed the generating capacity of the generator when connected to the power bus. A sensor can be communicative with the controller and connected to the power bus.

A power distribution system includes a power bus and a hybrid ESM as described above. The hybrid ESM includes a bus lead connected to the power bus, a first high-power module connectable to the bus lead, a second high-power module connectable to the bus lead, and low-power module connectable to the bus lead. A controller is operably connected to the first high-power module, the second high-power module, and the low-power module. The controller has a pulse mode where the first high-power module is connected to the bus lead, an extended mode where the first high-power module and the second high-power module are connected to the bus lead, and a low power extended mode where the low power module is connected to the bus lead.

A method providing power to an electrical system includes applying base load power to a power bus and applying generator power to the power bus. The power provided by the generator to the power bus is supplemented by a first high-power module. The power provided by the first high-power module is supplemented by a second high-power module. Base load power can be applied via a generator or a low-power module. In embodiments, the power modules, e.g., the first and second high-power module, are connectable to the generator to maintain a predetermined state of charge.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
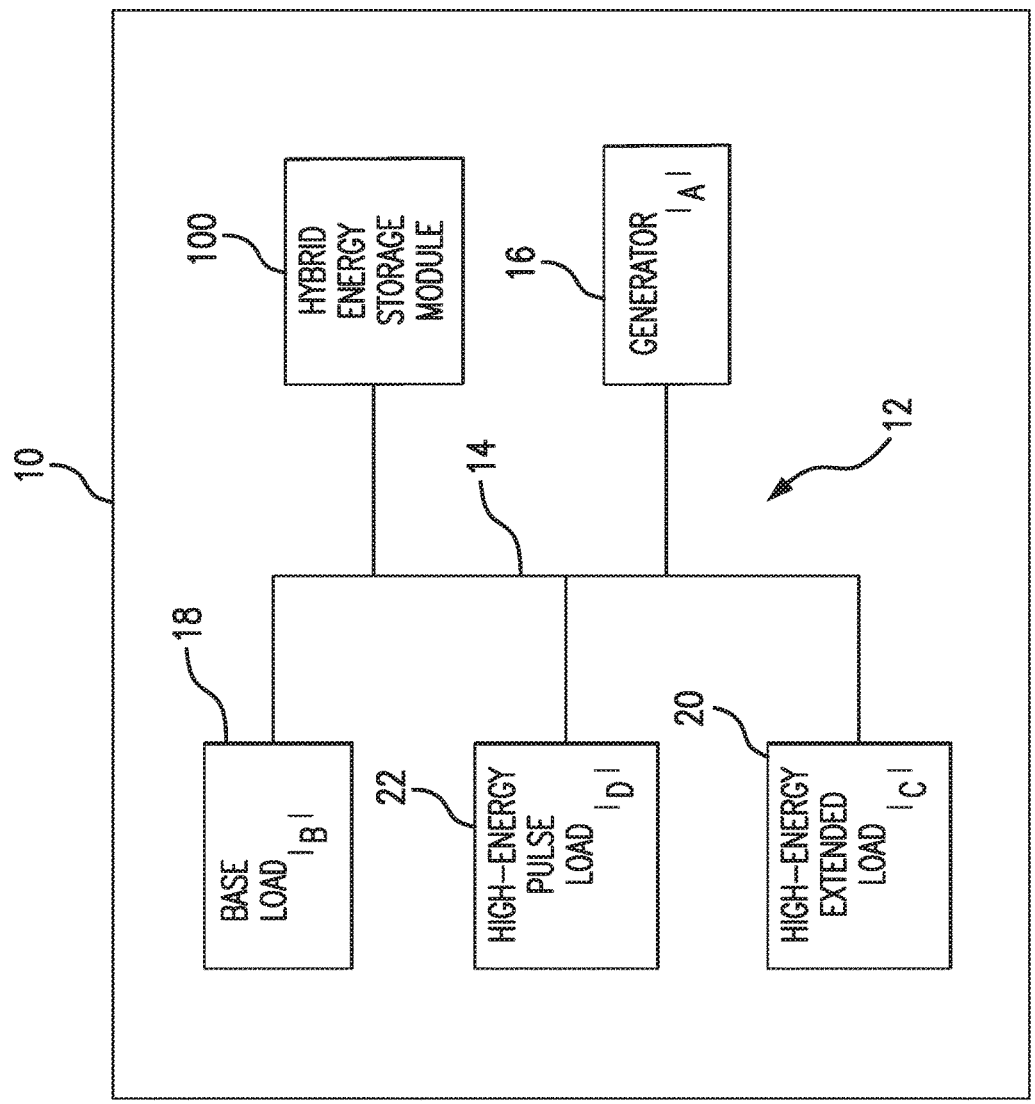
FIG. 1 is a schematic view of an exemplary embodiment of a hybrid electrical storage module (ESM) constructed in accordance with the present disclosure, showing the hybrid ESM connected to an electrical power distribution system of an aircraft.

Reference will now be made to the drawings wherein like reference numerals identify similar structural features or aspects of the subject disclosure. For purposes of explanation and illustration, and not limitation, a partial view of an exemplary embodiment of a hybrid energy storage module in accordance with the disclosure is shown in FIG. 1 and is designated generally by reference character 100. Other embodiments of hybrid energy storage modules, electrical power distribution systems employing such hybrid energy storage modules, and methods of using such energy storage modules in accordance with the disclosure, or aspects thereof, are provided in FIGS. 2-4, as will be described. The systems and methods described herein can be used for providing electrical power to high-energy pulse loads in aircraft electrical systems, though the present disclosure is not limited to pulse loads or to aircraft electrical systems in general.

Referring to FIG. 1, an aircraft 10 is shown. Aircraft 10 includes a power distribution system 12 with a power bus 14, a generator 16, and hybrid energy storage module (ESM) 100. Power distribution system 12 also includes a base load 18, a high-energy extended load 20, and a high-energy pulse load 22. Power bus 14 interconnects base load 18, high-energy extended load 20, high-energy pulse load 22, and hybrid ESM 100 with one another. Generator 16 in configured and adapted for applying electrical power by power bus 14, and is electrically communicative with one or more of base load 18, high-energy extended load 20, and high-energy pulse load 22 for providing power thereto. Hybrid ESM 100 is configured and adapted to provide to and/or receive power from power bus 14, and includes a plurality of energy storage modules for providing electrical power to one or more of base load 18, high-energy extended load 20, high-energy pulse load 22, as will be described. Power bus 14 may be a main power bus, such as a main power bus of an aircraft electrical system.

As shown in FIG. 1, generator 16 has a generating capacity A. Base load 18 has a base load level B, high-energy extended load 20 has a high-energy extended load level C, and high-energy pulse load 22 has a high-energy pulse load level D. Generating capacity A is lower than the aggregate of base load level B, high-energy extended load level C, and high-energy extended pulse load level D. In certain embodiments, generating capacity A is lower than the aggregate of base load level B and high-energy extended load level C. Hybrid ESM 100 is configured and adapted to supplement generating capacity A to accommodate the power requirement of one or more of high-energy extended load 20 and high-energy pulse load 22, as appropriate for operation of the electrical loads carried by aircraft 10.

Figure 2:
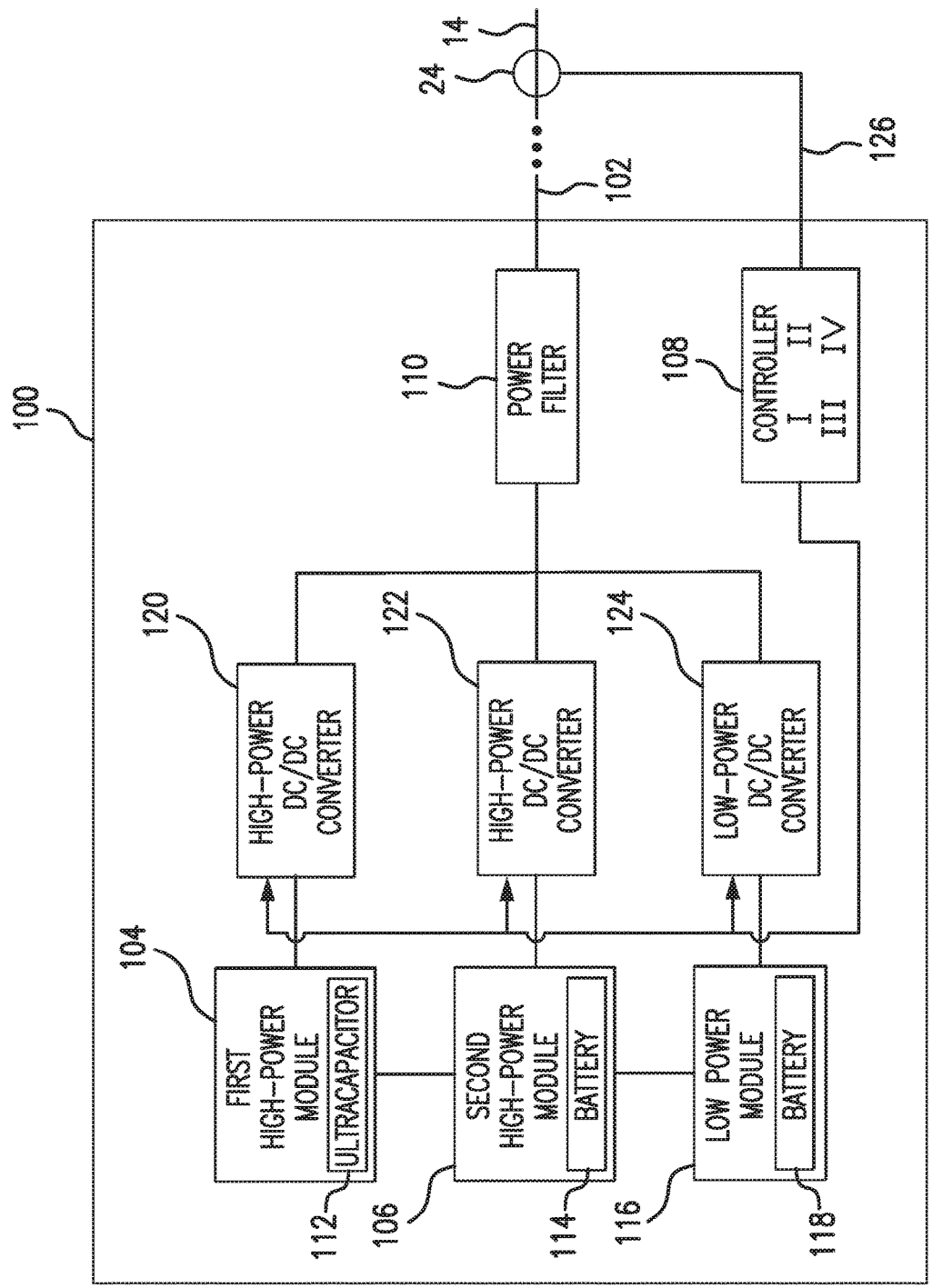
FIG. 2 is a schematic view of the hybrid ESM of FIG. 1, showing modules of the hybrid ESM operably connected to a power bus of the power distribution system by a controller.

With reference to FIG. 2, hybrid ESM 100 is shown. Hybrid ESM 100 includes a bus lead 102, a first high-power module 104 connectable to bus lead 102, and a second high-power module 106 connectable to bus lead 102. A controller 108 is operably connected to first high-power module 104 and second high-power module 106 and has a pulse mode I pulse mode wherein first high-power module 104 is connected to bus lead 102 and an extended mode II wherein both first high-power module 104 and second high-power module 106 are connected to bus lead 102.

First high-power module 104 includes a high-energy non-battery source 112, which can provide electrical power on the order of 10 kilowatts or more for relatively short periods of time, e.g., seconds. It is contemplated that high-energy non-battery source 112 can include an ultracapacitor or a supercapacitor, or similar device suitable for accommodating pulse loads.

Second high-power module 106 includes a high-power battery source 114. High-power battery source 114 provides a relatively rapid discharge capability relative a high-energy battery for burst power requirements, and may include a lithium-ion battery of a "phosphate" or manganese" descriptor, or a nickel hydrate chemistry. Incorporating high-power battery source 114 and high-energy non-battery source 112 allows hybrid ESM 100 to accommodate electrical loads connected to power bus 14 with different high-energy requirements. For example, high-energy non-battery source 112 can be connected to power bus 14 to accommodate high-energy pulse loads of short duration, limiting charging/discharging cycles of high-power battery source 114, whereas high-energy non-battery can be connected to power bus 14 to satisfy high frequency loads that cycle on and off relatively quickly. As will be appreciated by those of skill in the art in view of the present disclosure, this reduces the charge and discharge cycling frequency of high-power battery source 114, potentially extending the life of high-power battery source 114 with certain types of battery chemistries.

As also shown in the illustrated exemplary embodiment, hybrid ESM 100 includes a low-power module 116. Low-power module 116 is connectable to bus lead 102 and includes a high-energy battery 118. High-energy battery 118 provides a relative long run time relative to high-power non-battery power source, e.g., a nickel metal hydride or lithium ion cell. Controller 108 is operably connected to low-power module 116, and has a low-power extended mode III for connecting low-power module 116 to power bus 14, thereby providing power to the power bus from high-energy battery 118.

A first high-power DC/DC converter 120 connects first high-power module 104 to bus lead 102. In the illustrated exemplary embodiment, first high-power DC/DC converter 120 is a bidirectional solid-state device configured and adapted to disconnect first high-power module 104 from bus lead 102, connect first high-power module 104 to bus lead 102 to provide power thereto (i.e. discharge), or connect first high-power module 104 to bus lead 102 receive power therefrom (i.e. charge). Controller 108 configures connectivity of first high-power module 104 to bus lead 102 through first high-power DC/DC converter 120 according to the characteristics of power load on power bus 14.

A second high-power DC/DC converter 122 connects second high-power module 106 to bus lead 102. In the illustrated exemplary embodiment, second high-power DC/DC converter 122 is a bidirectional solid-state device configured and adapted to disconnect second high-power module 106 from bus lead 102, connect second high-power module 106 to bus lead 102 to provide power thereto (i.e. discharge), or connect second high-power module 106 to bus lead 102 receive power therefrom (i.e. charge). Controller 108 configures connectivity of second high-power module 106 to bus lead 102 through second high-power DC/DC converter 122 according to the characteristics of power load on power bus 14.

A low-power DC/DC converter 124 connects low-power module 116 to bus lead 102. In the illustrated exemplary embodiment, low-power DC/DC converter 124 is a bidirectional converter including solid-state switch devices configured and adapted to disconnect low-power module 116 from bus lead 102, connect low-power module 116 to bus lead 102 to provide power thereto (i.e. discharge), and connect low-power module 116 to bus lead 102 receive power therefrom (i.e. charge). Controller 108 configures connectivity of low-power module 116 to bus lead 102 through low-power DC/DC converter 124 according to the characteristics of power load on power bus 14. Providing dedicated converters for each of the first high-power module 104, second high-power module 106, and low-power module 116 accommodates the disparate power flow from (or to) first high-power module 104, second high-power module 106, and low-power module 116.

In illustrated exemplary embodiment, hybrid ESM 100 includes an EMI filter 110. EMI filter 110 is configured and adapted for conforming power flowing therethrough, e.g., conforming power provided by power bus 14 to power suitable for charging first high-power module 104 and/or second high-power module 106; conforming power provided by first high-power module 104 and/or second high-power module 106 to power bus 14 for powering load connected to power bus 14. In this respect EMI filter 110 reduces EMI switching noise generated in each of the power converters connected to EMI filter 110, and may supplement EMI filters incorporated into individual power converters that may not otherwise meet international, regulatory, and military requirements.

An input lead 126 connects controller 108 to a sensor 24 for providing an input to controller 108 indicative of electrical load on power bus 14 of aircraft power distribution system 12 (shown in FIG. 1). In this respect sensor 24 is communicative with power bus 14 for determining load characteristics of the electrical load(s) connected to the power bus 14. This allows for controller 108 to configure connectivity of within hybrid ESM 100 according to surfeit or deficit of generating capacity within power distribution system 12 (shown in FIG. 1).

Figure 3:
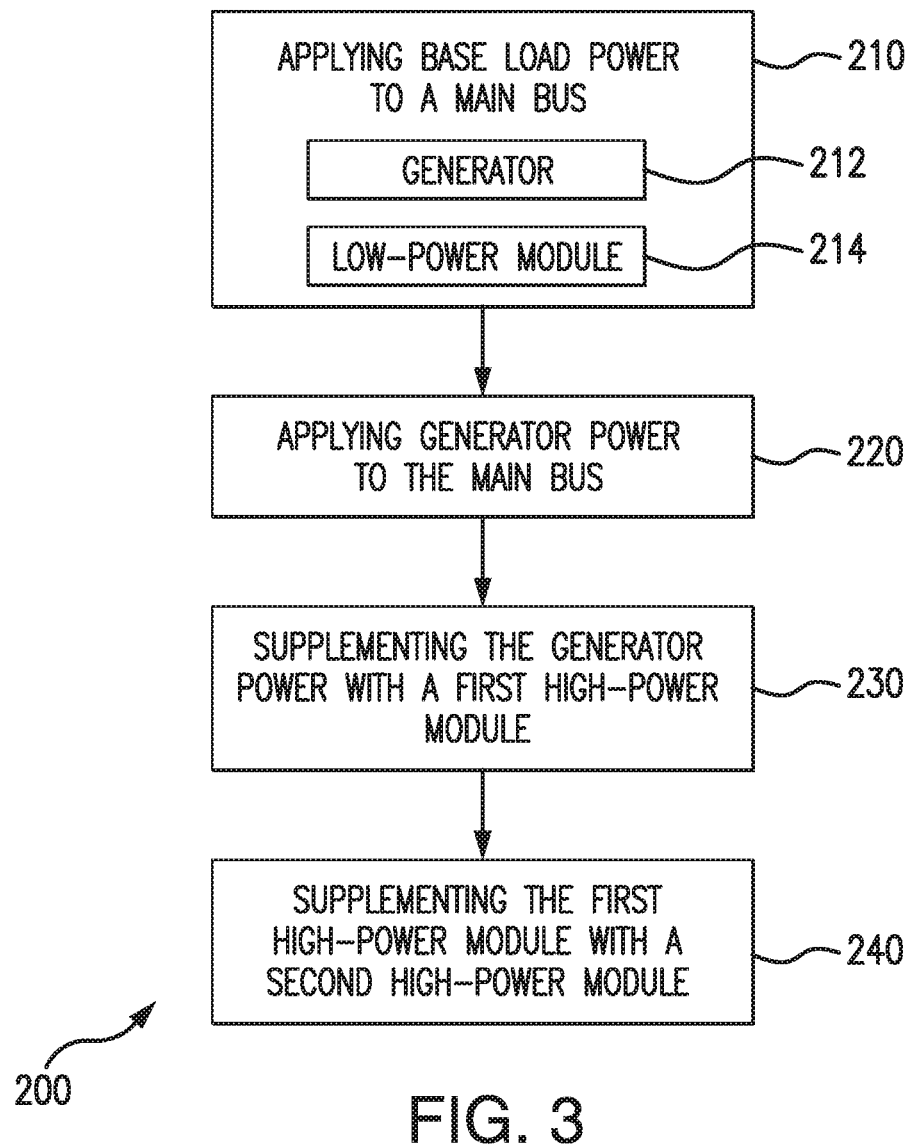
FIG. 3 is block diagram of a method of transferring power between a hybrid ESM and an aircraft electrical system, shown steps of the method.

With reference to FIG. 3, a method 200 of providing power to an electrical power distribution system is shown. Method 200 includes applying base load power to a power bus, e.g., power bus 14 (shown in FIG. 1), as shown with box 210. The base load power can be provided with a generator, e.g., generator 16 (shown in FIG. 1), as shown with box 212. The base load power can be provided with a low-power module, e.g., low-power module 116 (shown in FIG. 2), as shown with box 214.

Method 200 also in includes applying generator power to the power bus, as shown in box 220. The generator power (and/or base load power) can be supplemented with power applied by a first high-power module, e.g., first high-power module 104 (shown in FIG. 2), as shown with box 230. The generator power (and/or base load power) can be further supplemented by a second high-power module, e.g., second high-power module 106 (shown in FIG. 2), as shown with box 240.

It is contemplated that one or more of power module be selected for connecting to the power bus according to electrical load connected to the power bus. For example, a power module with a non-battery source can be selected for connection to the power bus and a power module with a battery source left disconnected from the power bus when a high frequency electrical load is connected to the power bus. This prevents high frequency charging and discharging of the battery source, which could otherwise damage the battery source. Alternatively, a high-energy low power battery can be selected for connection to the power bus when a low power, long duration, electrical load is connected to the power bus.

Figure 4:
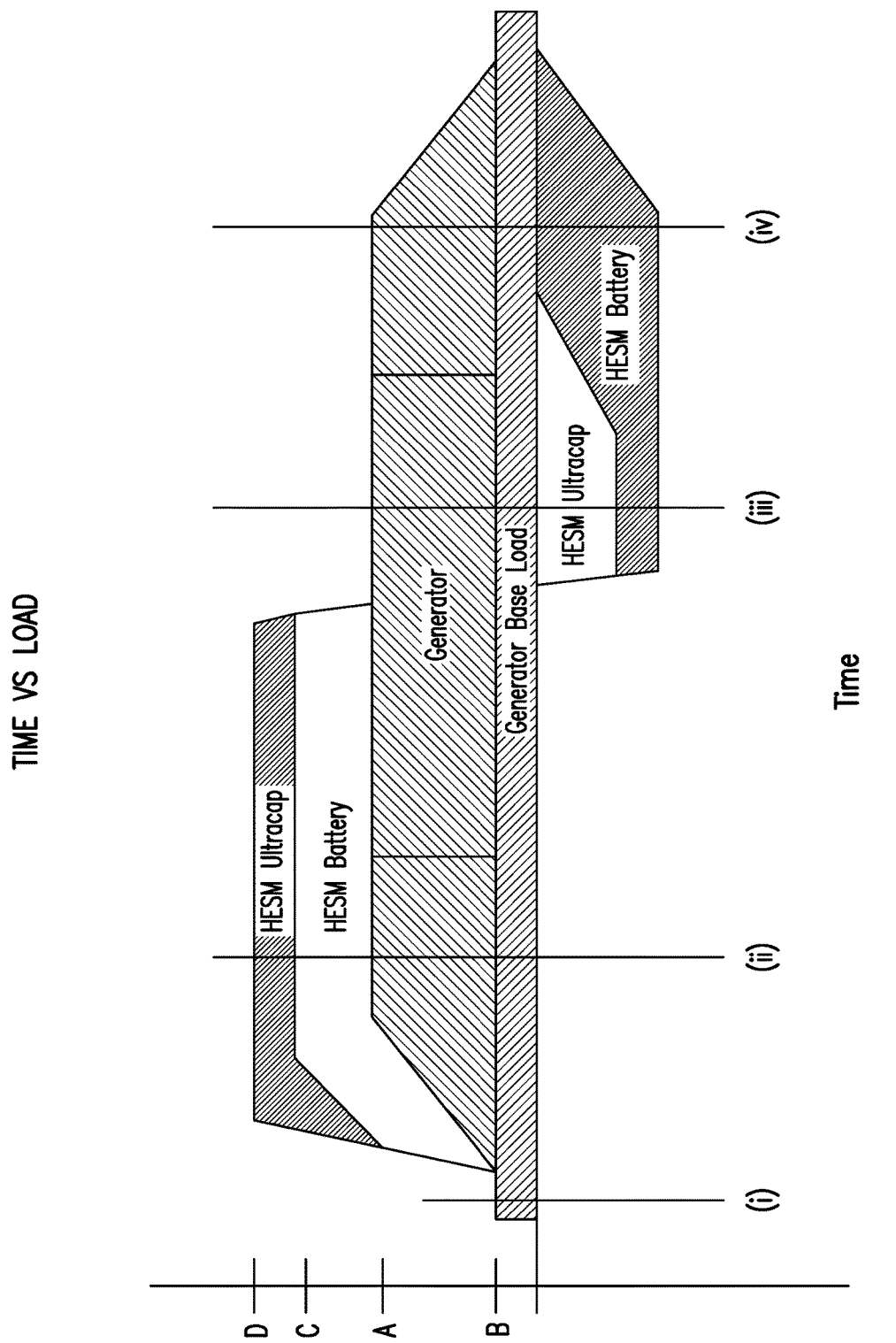
FIG. 4 is a chart of an exemplary load sharing profile for an aircraft electrical system, showing power flowing from the hybrid ESM according to the electrical load connected to the aircraft electrical system.

With reference to FIG. 4, an exemplary load profile 28 is shown. At time (i) base load 18 (shown in FIG. 1) is connected to power bus 14. Connectivity of base load 18 to power bus 14 imposes load level 'B' on power distribution system 12, which is within generator capacity 'A'. Since the electrical demand imposed on power distribution system 12 is within the capacity of generator 16 (shown in FIG. 1), controller 108 (shown in FIG. 2) arranges hybrid ESM 100 in mode IV (shown in FIG. 2), wherein none of first high-power module 104, second high-power module 106, and low power module 116 are connected to power bus 14.

Between time (i) and time (ii) high-energy extended load 20 connects to power bus 14. Connection of high-energy extended load 20 increases the load on power distribution system 12 to level 'C', which is above generator capacity 'A'. The increased load level and extended characteristic of load level 'C' cause controller 108 to configure hybrid ESM 100 in arrangement I, wherein second high-power module 106 is connected to power bus 14 for providing power thereto.

Between time (i) and time (ii) high-energy pulse load 22 connects to power bus 14. Connection of high-energy pulse load 22 further increases the load on power distribution system 12 to level 'D', which is above generator capacity 'A' load level 'C'. The further increased load level, and temporal (i.e. pulsed) characteristic of load level 'D' causes controller 108 to configure hybrid ESM 100 in arrangement II, wherein first high-power module 104 and second high-power module 106 are both connected to power bus 14 for providing power thereto.

Between time (ii) and time (iii) high-energy extended load 20 and high-energy pulse load 22 disconnect from power bus 14. Disconnection of high-energy extended load 20 and high-energy pulse load 22 from to power bus 14 allows controller 108 to reconfigure hybrid ESM 100 for charging first high-power module 104 and second high-power module 106 while in arrangement II, thereby readying each for subsequent use. Between time (iii) and time (iv) first high-power module 104 completes charging, second high-power module 106 remaining connected for purposes of continued charging.

As will be appreciated by those of skill in the art in view of the present disclosure, load profile 28 is an example of a single load profile that can be accommodated by the systems and methods described herein. It is to be understood and appreciated that fewer or more energy storage modules and/or energy storage modules of a different type can be incorporated by hybrid ESM 100 (shown in FIG. 1), as suitable for the contemplated load profile of a given electrical system.

With the advent of the 'more electric' aircraft there can be considerable variety in the type of electrical loads serviced by aircraft electrical system. These loads range from high-power, high-energy pulse loads to low-power, steady state loads. Considerations for power such loads include the slew rate associated with a given load, the characteristics of the power source powering the load, and interactions of powering power source with other power sources that may be active in conjunction with the powering power source.

In embodiments described herein, a hybrid ESM includes a low-power module, a high-power non-battery source, and a high-power battery source. The low-power source provides power to low-power loads, which are typically applied for extended periods of time. The low-power module includes a low-power DC/DC converter, which may be a dual active bridge or derivative circuit, and one or more high-energy density batteries.

The first high-power module provides electrical power for pulse loads and includes a high-energy non-battery source, such as an ultracapacitor. The high-energy non-battery power sources provide electrical power for transient loads, cyclically charging and discharging in concert with pulse loads connecting and disconnecting from the power distribution system. The cyclic charging and discharging of the high-energy non-battery power source smooths variation that may otherwise be present in electrical loads powered by the generator, reducing the impact that the variation could otherwise impact the generator and/or engine connected to the generator.

The second high-power module provides electrical power for high-power loads of an extended duration and includes a high-energy battery source. The second high-power module supplements electrical power provided by the first high-power module, and may be in addition to the power supplied by the generator. This allows the electrical system to power electrical loads that, in the aggregate, exceed the capacity of the generator powering the electrical power distribution system.

The methods and systems of the present disclosure, as described above and shown in the drawings, provide electrical power systems with generators that are relatively compact and lightweight relative to the peak electrical loads powered by the generators. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hybrid energy storage module (ESM), comprising:
a bus lead;
a first high-power module connectable to the bus lead, the first high-power module including a high-power DC/DC converter and an ultracapacitor or a supercapacitor;
a second high-power module connectable to the bus lead, the second high-power module including a DC/DC converter and a lithium-ion battery of a phosphate or manganese descriptor or nickel metal hydrate chemistry; and
a controller operably connected to the first high-power module and the second high-power module,
wherein the controller has (a) a pulse mode wherein the controller connects the first high-power module to the bus lead, and (b) an extended mode wherein the controller connects the first high-power module and the second high-power module to the bus lead to supplement electrical power applied to the lead with power from a low-power module according to electrical load on a power bus.

2. The hybrid ESM as recited in claim 1, further comprising a low-power module connectable to the bus lead, the controller being operably connected to the low-power module, the low-power module having lower power than the high-power module.

3. The hybrid ESM as recited in claim 2, wherein the low-power module comprises a low-power battery source.

4. The hybrid ESM as recited in claim 2, wherein the low-power module comprises a low-power DC/DC power converter.

5. The hybrid ESM as recited in claim 2, wherein the extended mode is a high-power extended mode, wherein the controller further comprises (c) a low-power extended mode wherein the low-power module is connected to the bus lead.

6. The hybrid ESM as recited in claim 1, further comprising an electromagnetic interference filter connected in series between the power modules and the bus lead.

7. The hybrid ESM as recited in claim 1, further comprising an input lead connected to the controller for providing an input to the controller indicative of electrical load on a power bus of an aircraft power distribution system.

8. The hybrid ESM as recited in claim 1, wherein the first high-power module is configured to provide about 10 kilowatts of more of electrical power to the power bus.

9. The hybrid ESM as recited in claim 1, wherein the low-power module is configured to provide a relative long run time relative to the first high-power module.

10. The hybrid ESM as recited in claim 1, wherein the low-power module includes a battery source having a nickel metal hydride or a lithium ion cell.

11. A power distribution system, comprising:
a power bus;
a hybrid energy storage module (ESM), comprising:
a bus lead connected to the power bus;
two or more high-power modules connectable to the bus lead, wherein the two or more high-power modules have a capacity of about 10 kilowatts or more;
a low-power module connectable to the bus lead; and
a controller operably connected to the first high-power module, the second high-power module, and the low-power module,
wherein the controller selects (a) a pulse mode wherein the controller connects a first of the two or more high-power modules to the bus lead, (b) an extended mode wherein the controller connects two of the two or more high-power modules to the bus lead, and (c) a low-power extended mode wherein the controller connects the low power module to the bus lead according to electrical load on the power bus.

12. The power distribution system as recited in claim 11, wherein the first high-power module comprises a high-power DC/DC power converter, and wherein the low-power module comprises a low-power DC/DC power converter.

13. The power distribution system as recited in claim 12, further comprising an electromagnetic interference filter connected in series between the bus lead and the power bus.

14. The power distribution system as recited in claim 11, wherein the first high-power module comprises a non-battery power source, wherein the second high-power module comprises a high-power battery source, wherein the second high-power module comprises a high-power DC/DC power converter, and wherein the low-power module comprises a low-power battery source.

15. The power distribution system as recited in claim 11, further comprising a generator connected to the power bus.

16. The power distribution system as recited in claim 11, further comprising (a) a base load, (b) a high-energy pulse load, and (c) a high-energy extended load connected to the power bus.

17. The power distribution system as recited in claim 11, further comprising a sensor communicative with the controller and connected to the power bus for determining electrical load on the bus.

18. A method of providing power to an electrical system, comprising:
applying base load power to a power bus;
applying generator power to the power bus;

determining load characteristics of an electrical load connected to the power bus;

connecting a first high-power module to the power bus when the electrical load has pulse load characteristics; and connecting a second high-power module to the power bus when the electrical load has extended load characteristics.

* * * * *